United States Patent [19]

Van Dyke

[11] Patent Number: 5,102,093
[45] Date of Patent: Apr. 7, 1992

[54] FAST VALVE

[75] Inventor: William J. Van Dyke, Grafton, Va.

[73] Assignee: Southeastern Universities Research Association, Newport News, Va.

[21] Appl. No.: 699,730

[22] Filed: May 14, 1991

[51] Int. Cl.⁵ .......................................... F16K 31/122
[52] U.S. Cl. .......................................... 251/63; 251/69
[58] Field of Search ....................... 251/68, 69, 73, 74, 251/62, 63, 327

[56] References Cited

U.S. PATENT DOCUMENTS

| | | | |
|---|---|---|---|
| 2,333,370 | 11/1968 | Graham | 251/68 X |
| 3,656,707 | 4/1972 | Marotta | 251/63 X |
| 3,797,804 | 3/1974 | Ashbaugh | 251/68 |
| 4,779,839 | 10/1988 | Sears | 251/68 |

Primary Examiner—Alan Cohan
Attorney, Agent, or Firm—Staas & Halsey

[57] ABSTRACT

A fast valve is disclosed that can close on the order of 7 milliseconds. It is closed by the force of a compressed air spring with the moving parts of the valve designed to be of very light weight and the valve gate being of wedge shaped with O-ring sealed faces to provide sealing contact without metal to metal contact. The combination of the O-ring seal and an air cushion create a soft final movement of the valve closure to prevent the fast air acting valve from having a harsh closing.

16 Claims, 2 Drawing Sheets

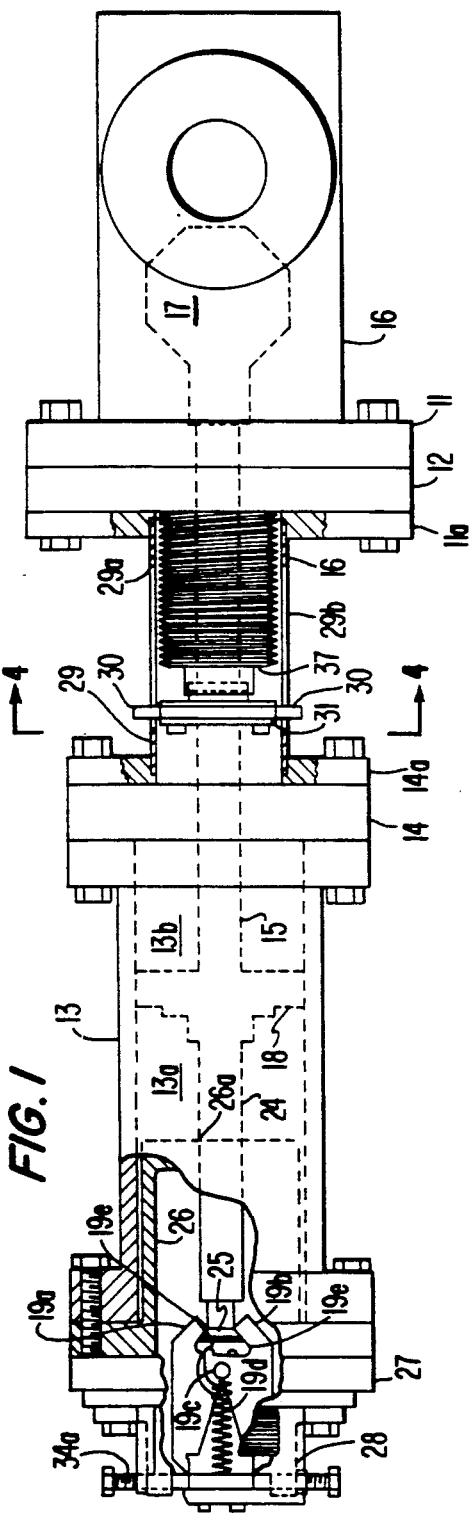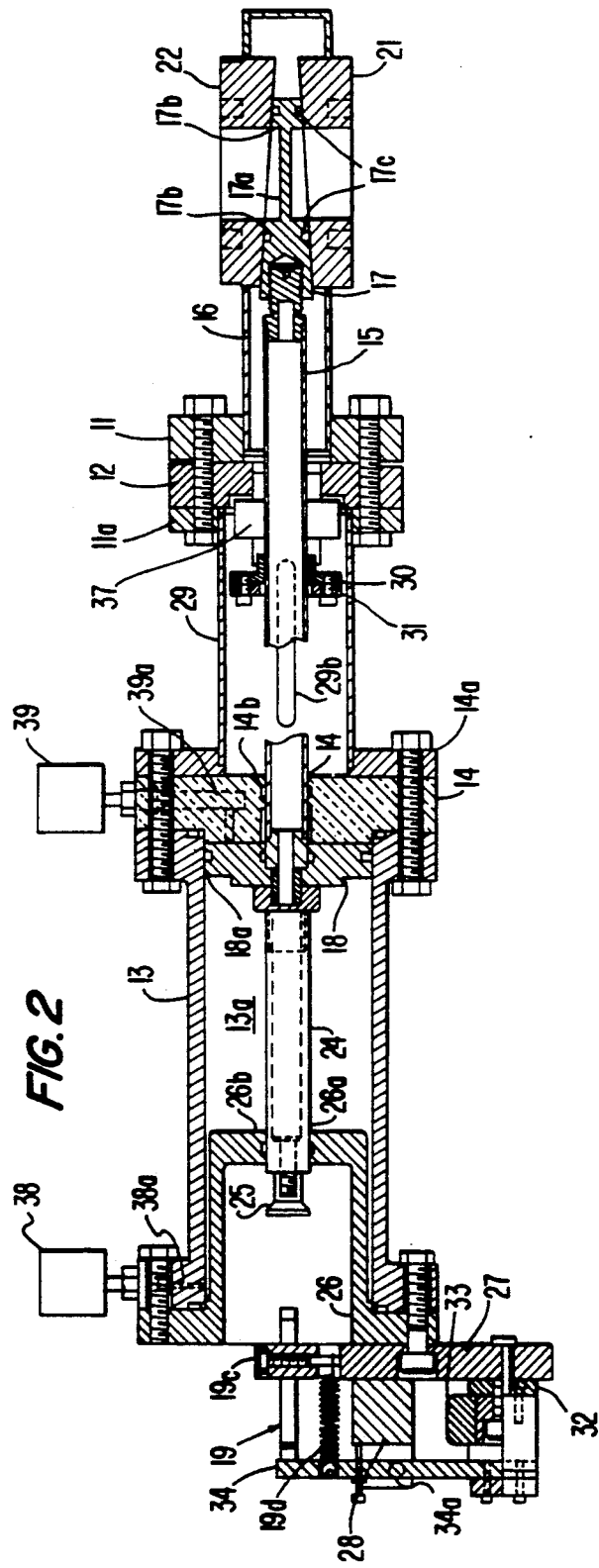

FAST VALVE

This invention was made in part with Government support under Contract Number DE-FG22-83PC 60806 awarded by the Department of Energy. The Government has certain rights in the invention.

This invention relates to valves that can close very rapidly and usually in than less than 10 milliseconds.

Fast valves are needed in a number of applications especially when a high vacuum is used in connection with electrically superconducting cavities such as the type being used in the continuous electron beam accelerator currently under construction in Newport News, Virginia.

The superconducting cavities are exposed to high vacuum and usually made of niobium which is superconductive at 2 degrees kelvin. The surface of niobium is very sensitive to contamination and presence of a very small particle of foreign material can cause a small spot to become conducting and cause the entire cavity to deteriorate and be unusable. Also, the presence of air oxidizes the surface of the cavities and makes them unusable. In case of a vacuum accident anywhere in the system, it is a necessity to isolate all other areas to prevent the in rush of air to the superconducting surfaces. Usually, the isolation is provided by a quick acting valve to close off the rest of the system from where the vacuum fault occurs. Valves have been made in the past that operated in a 25 millisecond time frame which time allows air to move a large distance through the valve before it can close. One of the most recent advancements is a quick operating shutter that closes but does not seal. The shutter operates in about 7 or 8 milliseconds but air travels around it and another slower valve is required to effect a seal. This arrangement is not satisfactory for use in the superconducting high vacuum cavity of niobium mentioned above.

The shutter type valve has a gate that is driven by a spring to close it. It is opened by air and held with a latching mechanism that is released electrically. The shutter does not have a seal because a seal slows down the action. A seal generally requires a gate to be closed and then move sideways or some other movement in order to maintain a seal.

Other applications for a fast valve are in high vacuum areas used for the plating, ion implantation, etc. of integrated circuits. Fast valves may be used any place that a vacuum that needs protection in case a valve is accidently opened or there is a vacuum leak.

The fast valve of the present invention achieves a seal without any extra movement by using a light weight gate tapered like a wedge with an O-ring on each side of the gate. The movement is in a straight linear direction into the seat without movement in other directions. The valve gate is operated by compressed air or other gas that is stored as an air spring in a small volume in an air cylinder and is held open by a trigger mechanism which is released electrically. A valve shaft, piston and valve gate all move as a unit when the trigger is released allowing the compressed air spring to drive the valve gate closed. As the valve gate closes, the trapped air under the piston is compressed. This slows the valve gate down at the very end of the stroke and acts as a cushion to prevent breakage. The valve closes in about 7 milliseconds and gives a 100% seal. In the high vacuum range used in superconducting cavities, the valve seals completely.

The fast valve is useable not only in vacuum systems but in medium pressure pneumatics, also. It may be used any place that a fast cutoff is needed such as for protection from pressure surges or contamination. It also may be used for sealing liquids as well as gases.

BRIEF DESCRIPTION OF THE DRAWINGS

The above, and other advantages of the invention, will become more apparent from the following detailed description of a preferred embodiment of the invention which is shown with the accompanying drawings in which:

FIG. 1 is a schematic view of the fast valve shown partly in cross section latched into the open position;

FIG. 2 is a cross section of the fast valve of FIG. 1 but with the valve in the closed position and rotated 90 degrees;

DETAILED DESCRIPTION OF THE DRAWINGS

Figure 3:
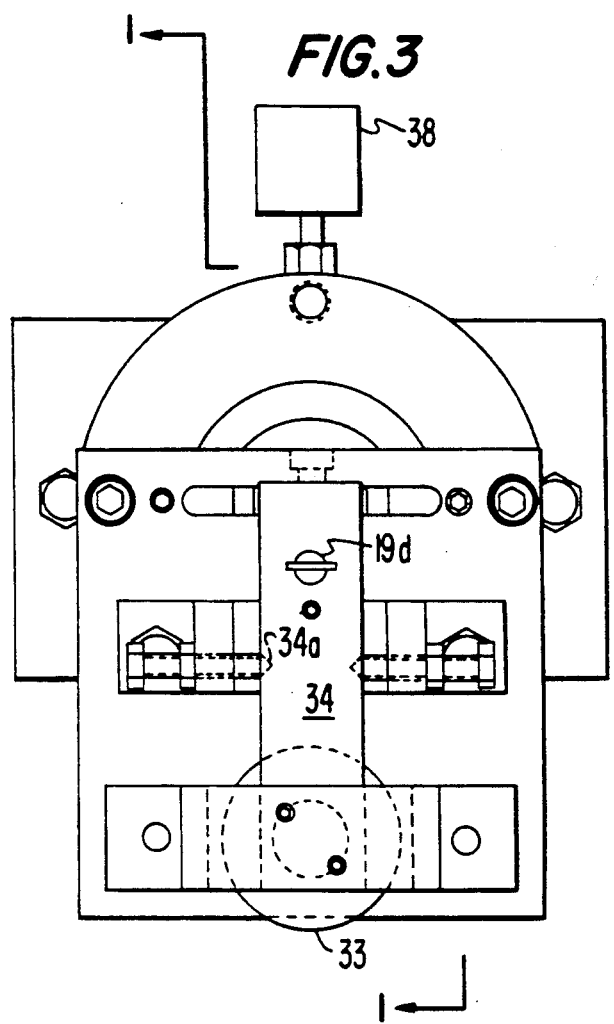
FIG. 3 shows an end view of the fast valve of FIGS. 1 and 2 seen from the left end.
Figure 4:
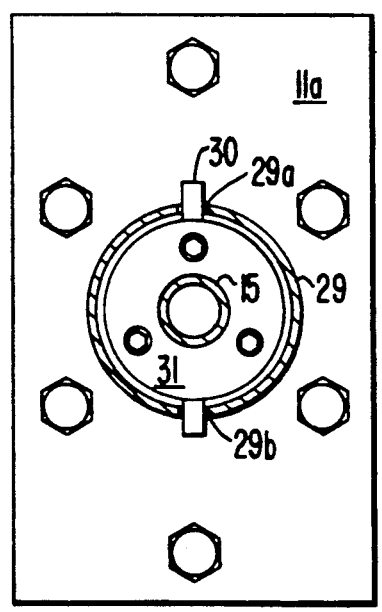
FIG. 4 is a cross sectional view taken on Section 4—4 of FIG. 1.

With reference to FIG. 2, which is in cross section, and starting from the right hand side, the main body of the valve is made up of valve box or housing 16. The main body of the fast acting valve includes valve seats 22 and 21. The housing 16 has a bonnet flange 11. The bellows mounts on plate 12. The bonnet flange 11 supports the valve box 16 which in turn carries the valve seats 20 and 21. Bellows mounting plate 12 and the bonnet plate 11 are fastened by bolts to flange 11a. Flange 11a in turn carries steel cylinder 29 which is fastened at its other end to another flange 14a which is fastened by a bolt to cylinder end seal 14. The cylinder end seal 14 has an opening through which slides shaft 15. The opening is maintained airtight by O-ring seal 14b. Also fastened by the same bolts to cylinder end seal is piston cylinder 13. At the opposite end, piston cylinder 13 is closed by dropped cup type of cylinder flange 26.

The linear moving assembly consists of a valve gate 17 at its foremost end together with valve shaft 15, piston 18 and shaft extension 24. It is to be noted from the figure that the valve gate has a portion cutaway to provide a thinner wall 17a. The entire linear moving assembly is as light as possible to cut down on the inertia and permit the valve gate 17 to move as rapidly as possible to a closed position once it has been actuated.

As seen in FIG. 2, the valve is wedge shaped and has an O-ring seal 17b and c on each face so that when the valve gate 17 is wedged into its seated and closed position between valve seat 21 and 22 the O-ring provides a seal to prevent any leakage of gas or fluid around the valve seat.

The valve gate 17 is carried by a fast valve shaft 15 which is a hollow shaft carried by piston 18 having a piston ring 18a. Also carried by piston 18 is shaft extension 24 which slides through an airtight opening 26a. The opening is made airtight by O-ring 26b. At the outside end of shaft extension 24 is an undercut shaft extension latch head 25. The valve gate 17, valve shaft 15, piston 18, and shaft extension 24 with latch head 25 all move as a linear unit along a straight line as the valve is closed and opened.

In order to maintain the vacuum seal the valve gate 17, a bellows 37 is welded at one end to square tube plate 12 to hold one end of the bellows in a fixed position. The other end of the bellows 37 is welded to the tubular valve shaft 15 to form a moving seal with the bellows expanding and contracting a the valve gate moves to the open and closed position. The bellows is a seamless, welded metal bellows, preferably stainless steel, obtainable from a number of different manufacturers. A welded metal bellows has the characteristics that it has a higher degree of expansion and contraction than other forms of metal bellows. The valve shaft 15 carries with it a switch activating plate 30 and retaining ring 31. The steel cylinder 29 which serves to protect the bellows 37 from damage also has two slots 29a and 29b through which portions of switch activating plate 30 projects. The projections can trip suitable limit switches (not shown) to remotely indicate the position of the valve gate.

The latch or restraining mechanism sits on latch plate or flange 27 which is held by bolts to the drop cup type cylinder flange 26 an electromagnet 33 is carried by magnet plate 32 and is adapted to actuate a lever which pivots about pivot point 34a. When lever 34 is actuated it releases the actual trigger or latch 19. As best seen in FIG. 1, latch 19 engages the undercut shaft extension latch head 25. The latch 19 has two members 19a and 19b pivoted about a common pivot point 19c to act similar to a pair of ice tongs to grip the top of shaft extension 24 by fitting in the undercut of latch head 25 and holding the valve gate 17 in its open position even when biased by air pressure to a closed position. A tension spring 19d pulls lever 34 down between tongs 19a and 19b as shaft extension 24 moves to the open valve position. When the shaft extension 24 extends or moves to the open valve position, the latching head 25 pushes on the two small bumps 19e causing them to close the tongs and latch the latch head. The spring 19d pulls lever 34 between the tongs when they move back down and holds them apart so that they cannot open until the valve is actuated by the electromagnet 33.

When actuated, the electromagnet 33 pulls the lever 34 causing it to pivot about pivot 34a on block 28 and pull the lever 34 from between the tongs 19a and 19b permitting them to open up and release the latch head 25.

The latch 19 only holds 0.010 to 0.015 of an inch at the edge of the undercut latch head 25. It will be obvious to a person skilled in the art that other types of latching mechanisms could be utilized. The lever 34 must include a material that will be responsive to the pull of the electromagnet 33 when it is activated.

The fast valve includes a normally open three way solenoid 38 which is adapted to connect into passage 38a which leads to the inside of the piston cylinder 13 above piston 18. Another three way solenoid valve 39 which is normally closed is connected to passageway 39a which leads to the piston cylinder 13 below piston 18.

In operation, the normal position would be for the valve gate 17 to be locked in its open position by the latch 19 holding the undercut of the latched head in such a position that it is cocked and ready to be released. At the same time compressed air has been let into the piston cylinder 13 through three way solenoid valve 38 to be in the space 13a above the piston 18. The pressure is approximately 120 pounds per square inch and the diameter of the piston is approximately 2 ½ inches. Thus, the air pressure in space 13a acts as an air or gas spring trying to push the piston 18, as shown in FIG. 1, to the right and slam the valve gate 17 closed. It is restricted from such movement by the latching mechanism. The space 13b below the piston cylinder is at this time at atmospheric pressure.

The valve gate is actuated by a signal. A sensitive sensor (not shown) preferably an ion pump which is a vacuum pump with no moving parts, monitors the vacuum. If the pressure rises ever so slightly an electric current which instantly increases with the slightest pressure rise in the system, discharges a capacitor (not shown) through the solenoid electromagnetic coil 33 which attracts the lever 34 which releases the latch 19 which permits the valve gate 17 to move to the closed position under the impetus of the air spring in space 13a.

The shaft extension 24, piston 18 and valve gate 17 are aluminum and the valve shaft is made of stainless steel tubing so the entire moving assembly is very lightweight with small inertia. This small inertia permits the compressed air spring to accelerate the valve gate to the closed position and drive it all the way closed to complete a 100% seal in approximately 7 milliseconds. The air below the piston 18 in space 13b, which is at atmospheric pressure, is compressed and acts as a cushion to slow the valve gate down. While the space is opened through passageway 39a to atmospheric pressure the orifice of passageway 39a, which may be a separate orifice cup, prevents the air from bleeding out instantly. The orifice is about 0.09 inches in diameter. The pressure builds up in space 13b at first slowly so the piston is cushioned at its last movement to slow the valve gate closure rate down as it moves into the sealed position. This results in a gentle sealing operation notwithstanding the 7 milliseconds speed of the closure. Also, the two O-rings 17a and 17b on each face of the valve gate 17 are in contact with the valve seats 20 and 21. This avoids metal to metal contact and helps cushion the closure. The movement of the valve gate practically stops when the seal is less than an 1/16 of an inch from being fully closed.

The solenoid valve 38 which is normally open allows the compressed air to remain on the closing side of piston 18 to hold the valve closed. The angle of the wedge or taper of valve gate 17 is chosen to provide a locking action to keep the gate in position so that the valve gate will stay closed even if pressure is removed from space 13a.

After repairs or other action is taken and it is desired to reopen the valve, power is applied to both solenoids. Solenoid valve 38 is closed and closes the air supply and opens chamber 13a to the atmosphere. Solenoid valve 39 which is normally closed opens as a result of the power being applied to it and allows compressed air to enter space 13b to move the piston 18 which carries with it valve gate 17 to the left in FIG. 2 to move the valve gate to the valve's open position. Thus space 13b acts as a return air or gas space. When the piston reaches the full open stroke the undercut head 25 on the shaft extension 24, pushes on latch 19 to move the latch into the latched position and just a little beyond. That allows the spring 19d to pull the lever 34 down between the ends of the two latching tongs 19a and 19b and sit there to keep them in the locked position. The power is then turned off on both solenoid valves 38 and 39 which permits the compressed air on the bottom side of the piston in space 13b to bleed therefrom through passageway 39a and return to atmospheric pressure and allows compressed air to enter into the driving side of the piston or space 13a to again create an air spring. This moves the latch head 25 a very short distance to the right in FIGS. 1 and 2 and on the order of ⅛ inch or less to apply pressure to the fingers or tongs 19a and 19b of the latch which applies pressure to the edge of the lever 34. The friction of the tongs on the latch will hold the lever in position as well as being held there by the small spring 19d. The valve gate will remain in its locked open position under the compressed air spring biased to immediately move the valve gate to the closed position when the electromagnet 33 is actuated.

The valve can be also moved to the closed position by manually pushing on lever 34 if it is desired to test the function of the valve. After testing the reopening sequence is followed.

As is seen from the above description, the moving parts of the valve are light weight and move in a single direction with no twisting or turning or pivoting to the closed position. Also, the valve gate has a wedge or tapered shape which allows the O-ring seal to contact the valve seat without the gate itself touching the seat. Thus, since there is no metal to metal contact there is no wear or metal particle generated. The light weight is accomplished by the major parts being made of aluminum and excess material being removed except where needed for the two seals. While stainless steel tubing is utilized for the valve shaft, it is still light weight and is needed because the bellows can be more readily welded to it. It is difficult to weld a stainless steel bellows to aluminum. Thus, there has been disclosed a fast valve that can close at a speed on the order of 7 milliseconds which forms a complete seal of a vacuum or similar system with a soft closure of the valve that avoids metal particles being shedded into the system.

It is to be understood that the following claims are intended to cover all of the generic and specific features of the invention herein described and it is to be further understood that the specific embodiments shown herein are not to be construed in the limiting sense but merely to depict and illustrate the principles of the present invention.

What is claimed is:

1. A fast valve comprising:
   a wedge shaped valve seat;
   a wedge shaped valve gate complementary to said valve seat having an open position and a closed position;
   a gas tight cylinder having an opening at one end thereof;
   a piston in said cylinder dividing said cylinder into a gas spring space and a return gas space;
   a valve shaft connected at one end to said valve gate and at the other end to said piston and passing through said opening;
   a restraining mechanism for holding said valve gate in the open position;
   at least one gas passageway connected to said gas spring space in said cylinder that permits gas to pressurize said space and create a gas spring for biasing said valve to a closed gate position and also permit gas to escape from said gas spring space;
   at least one gas passageway connected to said return gas space in said cylinder permitting gas to escape from said space when said valve gate is moving to a closed position and also permit gas to enter said return gas space to move said valve gate to an open position when gas in said gas spring space is permitted to escape; and
   an actuator for said restraining mechanism to release said valve gate and permit it to move rapidly to the closed position by the force exerted by the pressurized gas in said gas spring space.

2. The fast valve of claim 1 wherein said valve gate is made of a light weight metal and said fast valve includes an O-ring seal between said valve gate and said valve seat to both provide a gas tight seal and prevent metal to metal contact.

3. The fast valve of claim 2 which further includes:
   a housing surrounding said valve shaft; and
   a metal welded bellows attached at one end to said valve shaft by a gas tight seal and attached at the other end to said housing by a gas tight seal so as to provide a gas tight movable seal for said valve shaft.

4. The fast valve of claim 3 which further includes a shaft extension projecting from said piston which is held by said restraining mechanism while said valve gate is in the open position.

5. The fast valve of claim 4 wherein said shaft extension has an undercut head and said restraining mechanism includes a latch for holding said undercut head.

6. The fast valve of claim 5 wherein said latch includes two opposed tong members pivoted about a common pivot for gripping under the undercut head of said shaft extension with each o said tong members further including a bump on the opposite side of said pivot for forcing said tong members under said undercut when contacted by said enlarged head.

7. The fast valve of claim 6 wherein said two opposed tong members include two spaced apart tong levers integrated therewith which are locked apart by said latch when said valve gate is in its open position.

8. The fast valve of claim 7 wherein said latch includes a pivoted lever that has one end locking said tong levers apart and a second end for pivoting said lever from between said tong levers which activated to release said latch and permit said valve gate to move to the closed position.

9. The fast valve of claim 8 which further includes an electromagnet adjacent said tong lever second end for causing said lever to be activated when electricity is passed through said electromagnet.

10. The fast valve of claim 5 wherein said gas passageway connected to said return gas space include a restricted orifice to slow the escape rate of the gas in said return gas space when said valve gate is being closed so that a ga cushion provides a soft closure.

11. The fast valve of claim 10 which further includes:
    a normal three way powered valve located in said passageway connected to said gas spring space which normally connects said gas spring space to a source of pressurized gas and when actuated connects to atmospheric pressure; and
    a normally closed three way powered valve located in said passageway connected to said return gas space which normally connects said return gas space to atmospheric pressure and when actuated connects to a source of pressurized gas for returning the said valve gate to the open position.

12. The fast valve of claim 11 wherein said valve gate, said valve shaft, said piston and said shaft extension are all made light weight and are designed to move together in a straight line to provide extremely fast valve closure and sealing under the force of said pressurized gas in said gas spring space once said restraining mechanism is actuated to release said shaft extension.

13. The fast valve of claim 2 wherein said valve gate includes opposite faces that have been recessed to provide a thin wall for weight reduction.

14. The fast valve of claim 1 which further includes:
a housing surrounding said valve shaft; and
a metal welded bellows attached at one end to said valve shaft by a gas tight seal and attached at the other end to said housing by a gas tight movable seal so as to provide a gas tight movable seal for said valve shaft.

15. The fast valve of claim 1 which further includes:
a shaft extension projecting from said piston which has an undercut head; and
a latch for holding said undercut head.

16. The fast valve of claim 15 which further includes:
a normal three way powered valve located in said passageway connected to said gas spring space which normally connects said gas spring space to a source of pressurized gas and when actuated connects to atmospheric pressure; and
a normally closed three way powered valve located in said passageway connected to said return gas space which normally connects said return gas space to atmospheric pressure and when actuated connects to a source of pressurized gas for returning the said valve gate to the open position.

* * * * *